(12) United States Patent
Lewandowski et al.

(10) Patent No.: US 9,926,474 B2
(45) Date of Patent: Mar. 27, 2018

(54) PRESSURE-SENSITIVE ADHESIVE COMPOSITIONS AND ADHESIVE ARTICLES INCLUDING THE SAME

(71) Applicant: 3M INNOVATIVE PROPERTIES COMPANY, St. Paul, MN (US)

(72) Inventors: Kevin M. Lewandowski, Inver Grove Heights, MN (US); Jason D. Clapper, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 119 days.

(21) Appl. No.: 14/762,702

(22) PCT Filed: Jan. 27, 2014

(86) PCT No.: PCT/US2014/013114
§ 371 (c)(1),
(2) Date: Jul. 22, 2015

(87) PCT Pub. No.: WO2014/120593
PCT Pub. Date: Aug. 7, 2014

(65) Prior Publication Data
US 2015/0353785 A1 Dec. 10, 2015

Related U.S. Application Data

(60) Provisional application No. 61/759,593, filed on Feb. 1, 2013.

(51) Int. Cl.
| C09J 129/10 | (2006.01) |
| C09J 11/08 | (2006.01) |
| C09J 7/02 | (2006.01) |
| C09J 9/00 | (2006.01) |

(52) U.S. Cl.
CPC ............. *C09J 129/10* (2013.01); *C09J 7/021* (2013.01); *C09J 9/00* (2013.01); *C09J 11/08* (2013.01); *C09J 2201/606* (2013.01); *Y10T 428/2878* (2015.01)

(58) Field of Classification Search
CPC . C09J 11/08; C09J 129/10; C09J 7/021; C09J 9/00; C09J 2201/606; Y10T 428/2878
USPC ....................................................... 428/343
See application file for complete search history.

(56) References Cited

U.S. PATENT DOCUMENTS

| 3,085,977 A | 4/1963 | Park |
| 3,119,880 A | 1/1964 | Kollar |
| 3,718,634 A | 2/1973 | Schultz |
| 4,960,954 A | 10/1990 | Hoelderich |
| 5,130,435 A | 7/1992 | Hoelderich |
| 5,486,586 A | 1/1996 | Kroener |
| 5,717,034 A | 2/1998 | Dershem |
| 5,777,183 A | 7/1998 | Mueller |
| 6,419,797 B1 | 7/2002 | Scherf |
| 7,074,970 B2 | 7/2006 | Ishii |
| 7,851,930 B1 | 12/2010 | Gupta |
| 8,137,807 B2 | 3/2012 | Clapper |
| 2002/0062923 A1* | 5/2002 | Forray ........................ C08J 3/24 156/307.1 |
| 2012/0220806 A1 | 8/2012 | Wick |

FOREIGN PATENT DOCUMENTS

| CN | 1355265 A | 6/2002 |
| CN | 101130671 A | 2/2008 |
| EP | 0 447 115 A1 | 9/1991 |
| EP | 2 119 437 A1 | 11/2009 |
| JP | H05-70654 | 3/1993 |
| JP | 2011-12227 A | 1/2011 |
| JP | 2011-12228 A | 1/2011 |
| JP | 2011-21141 A | 2/2011 |
| KR | 10-2010-0055161 | 5/2010 |
| WO | WO 89/08097 | 9/1989 |
| WO | WO 91/04242 | 4/1991 |
| WO | 2008145618 A1 | 12/2008 |
| WO | WO 2008145618 A1 | 12/2008 |
| WO | WO 2014/018258 | 1/2014 |

OTHER PUBLICATIONS

Shostakovskii, "Synthesis of Vinyl Ethers Containing Functional Groups and Heteroatoms", Russian Chemical Reviews, 1968, vol. 37, No. 11, pp. 906-919.
International Search Report for PCT International Application No. PCT/US2014/013114 dated Jun. 5, 2014, 3 pages.

* cited by examiner

Primary Examiner — Lanee Reuther
Assistant Examiner — Chun-Cheng Wang
(74) Attorney, Agent, or Firm — Bradford B. Wright

(57) ABSTRACT

A pressure-sensitive adhesive composition comprises a polyvinyl ether polymer. The polyvinyl ether polymer comprises 2-alkylalkoxyethylene monomeric units independently represented by the formula wherein $R^1$ and $R^2$ represent alkyl groups, and wherein taken together $R^1$ and $R^2$ have from 8 to 30 carbon atoms. An adhesive article comprises a layer of the pressure-sensitive adhesive composition on a substrate.

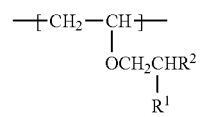

15 Claims, 1 Drawing Sheet

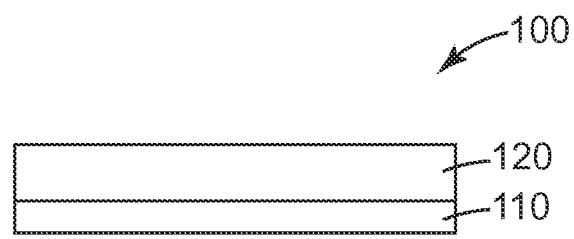

PRESSURE-SENSITIVE ADHESIVE COMPOSITIONS AND ADHESIVE ARTICLES INCLUDING THE SAME

TECHNICAL FIELD

The present disclosure broadly relates to pressure-sensitive adhesive compositions and articles including the same.

BACKGROUND

Pressure-sensitive adhesive (PSA) tapes are virtually ubiquitous in the home and workplace. In its simplest configuration, a pressure-sensitive tape comprises a PSA and a backing. The PSA is tacky at the intended use temperature, and adheres to a variety of substrates using only moderate pressure to form the bond. In this fashion, PSA tapes constitute a complete, self-contained bonding system.

According to the Pressure-Sensitive Tape Council, PSAs are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power). These measurements taken together constitute the balance of properties often used to characterize a PSA.

With broadened use of PSA tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of PSA materials available today, including natural crude or synthetic rubbers, block copolymers, and acrylic ester polymeric compositions. Acrylic ester PSAs in particular have been the focus of a great deal of development over the last half century as the performance demands for PSAs have increased. Acrylic ester PSAs may be closely tailored to provide a number of desired attributes such as, e.g., elasticity, tackiness, transparency, resistance to oxidation and sunlight, as well as have the necessary degree of adhesion and cohesion for demanding tape applications.

Poly(isobutylene), polyvinyl ethers, and polybutadiene can also be made into PSAs, but due to various deficiencies they are less common in the market.

SUMMARY

In one aspect, the present disclosure provides a pressure-sensitive adhesive composition comprising a polyvinyl ether polymer, wherein the polyvinyl ether polymer comprises 2-alkylalkoxyethylene monomeric units independently represented by the formula

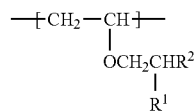

wherein $R^1$ and $R^2$ represent alkyl groups, and wherein taken together $R^1$ and $R^2$ have from 8 to 30 carbon atoms.

In another aspect, the present disclosure provides a pressure-sensitive adhesive article comprising a layer of pressure-sensitive adhesive composition according to the present disclosure disposed on a substrate.

Pressure-sensitive adhesive compositions according to of the present disclosure exhibit desirable levels of tack and adhesion, and in some embodiments may be particularly suitable for adhesion to low surface energy substrates and/or vibration damping applications. The pressure-sensitive adhesive compositions may have a very low glass transition temperature ($T_g$), a low solubility parameter, and a low storage modulus resulting in a very conformable pressure-sensitive adhesive composition.

As used herein:

the term "acidic" means at least as acidic as dodecanoic acid;

the term "alkyl" includes alkyl groups which may be linear, cyclic, branched, or a combination thereof unless specified otherwise;

the term "alkoxy", which is equivalent to alkyloxy, includes alkoxy groups which may be linear, cyclic, branched, or a combination thereof;

the term "monomer" refers to a molecule which can undergo polymerization thereby contributing constitutional units to the essential structure of a polymer molecule and/or a substance composed of such molecules;

the term "monomeric unit" refers to the largest constitutional unit (typically divalent) contributed by a single monomer molecule to the structure of a polymer molecule or oligomer molecule;

the term "non-acidic" means less acidic than dodecanoic acid;

the term "polymer" refers to a polymer molecule and/or a substance composed of like polymer molecules;

the term "polyvinyl ether polymer" refers to a polymer preparable by polymerization of at least one vinyl ether monomer;

the term "vinyl ether" refers to a compound including the monovalent functional group $CH_2{=}CH{-}O{-}CH_2{-}$; and the term "ethylene" as used to indicate a chemical group refers to the divalent group $-CH_2CH_2-$ (i.e., ethane-1,2-diyl). An ethylene group may be substituted with other groups if specifically indicated. For example, the ethoxyethylene group (a divalent group) can be represented by the formula

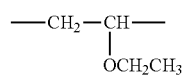

wherein the dashes indicate free valence electrons.

Numerical ranges in the specification and claims are to be understood as being inclusive of their end points unless expressly excluded. Features and advantages of the present disclosure will be further understood upon consideration of the detailed description as well as the appended claims.

BRIEF DESCRIPTION OF THE DRAWINGS

FIG. 1 is a schematic side view of an exemplary adhesive article 100 according to the present disclosure.

It should be understood that numerous other modifications and embodiments can be devised by those skilled in the art, which fall within the scope and spirit of the principles of the disclosure. The FIGURE may not be drawn to scale.

DETAILED DESCRIPTION

Pressure-sensitive adhesive compositions according to the present disclosure comprise a polyvinyl ether polymer. The polyvinyl ether polymer comprises 2-alkylalkoxyethylene monomeric units are independently represented by the formula

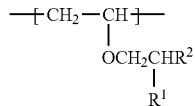

wherein $R^1$ and $R^2$ represent alkyl groups, and wherein taken together $R^1$ and $R^2$ have from 8 to 30 carbon atoms, preferably from 8 to 20 carbon atoms. Preferably, $R^1$ and $R^2$ each independently have from 3 to 14 carbon atoms. The 2-alkylalkoxyethylene monomeric units having from 12 to 34 carbon atoms may be derived from polymerization of corresponding vinyl ethers.

Exemplary useful 2-alkylalkyl vinyl ethers that can be polymerized to form the above 2-alkylalkoxyethylene monomeric units include 2-propyl-1-heptyl vinyl ether, 2-butyl-1-octyl vinyl ether, 2-pentyl-1-nonyl vinyl ether, 2-hexyl-1-decyl vinyl ether, 2-heptyl-1-undecanyl vinyl ether, 2-octyl-1-dodecyl vinyl ether, 2-dodecyl-1-hexadecyl vinyl ether, 2-hexyl-1-dodecyl vinyl ether, 2-ethyl-1-octadecyl vinyl ether, 2-decyl-1-tetradecyl vinyl ether, 2-undecyl-1-pentadecyl vinyl ether, 2-dodecyl-1-hexadecyl vinyl ether, 2-tridecyl-1-heptadecyl vinyl ether, 2-tetradecyl-1-octadecyl vinyl ether, and combinations thereof.

In some embodiments, the 2-alkylalkoxyethylene monomeric units are independently represented by the formula

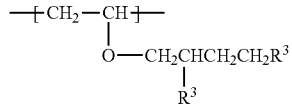

wherein $R^3$ represents an alkyl group having from 3 to 12 carbon atoms.

Vinyl ethers corresponding to 2-alkylalkoxyethylene monomeric units, suitable for use in practice of the present disclosure, may be obtained from commercially sources and/or prepared, for example, according to known methods. One common synthetic method is by direct vinylation. According to this method, a hydroxylated compound is added to acetylene in the presence of a basic catalyst according to the Favorskii-Shostakovskii reaction. A review of methods for making vinyl ethers can be found in M. F. Shostakovskii et al., "Synthesis of Vinyl Ethers Containing Functional Groups and Heteroatoms" in *Russian Chemical Reviews,* 37(11), pages 906-919, 1968 and references contained therein. Additional methods are described in U.S. Pat. Nos. 4,960,954 and 5,130,435 (both to Hoelderich et al.).

In embodiments such as, for example, those embodiments in which the 2-alkylalkoxyethylene monomeric units having from 12 to 34 carbon atoms are derived from vinyl ethers of Guerbet alcohols, $R^2$ has the formula —$CH_2CH_2R^1$, wherein $R^1$ is as previously defined. Guerbet alcohols are specific branched alcohols. They are primary alcohols branched at the carbon atom in the beta position to the —OH group. Guerbet alcohols are well known. They may be obtained by what is called the Guerbet reaction, a dimerization reaction of primary or secondary alcohols at elevated temperature in the presence of a catalyst, which has been known for more than 100 years, and which can be described by the following general scheme (wherein R is an aliphatic group (e.g., alkyl)):

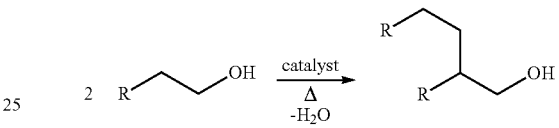

The Guerbet reaction can also be carried out using a combination of two different alcohols (e.g., butanol and dodecanol), resulting in a mixture of products requiring separation, but providing a route for the preparation of a wide range of 2-alkylalkanols useful for preparation of 2-alkylalkyl vinyl ethers used in practice of the present disclosure. Useful 2-alkylalkanols include $C_{10}$-$C_{32}$ Guerbet alcohols, preferably $C_{12}$-$C_{20}$ Guerbet alkanols. Further details concerning Guerbet alcohols suitable for synthesis of 2-alkylalkanol vinyl ethers used in making PSA compositions according to the present disclosure can be found, for example, in U.S. Pat. No. 3,119,880 (Kollar et al.), U.S. Pat. No. 5,777,183 (Mueller et al.), and U.S. Pat. No. 6,419,797 (Sherf et al.); in U.S. Patent Appl. Publ. No. 2012/0220806 A1 (Wick et al.), and in PCT Internat. Publ. No. WO 91/04242 A1 (Miller et al.). Useful Guerbet alcohols are also available from commercial suppliers including, for example: Condea Chemie, Hamburg, Germany; Michel Company, New York, N.Y.; Nissan Chemical America Corporation, Houston, Tex.; and Sasol North America, Houston Tex.

Exemplary useful Guerbet alcohols include 2-propyl-1-heptanol, 2-butyl-1-octanol, 2-pentyl-1-nonanol, 2-hexyl-1-decanol, 2-heptyl-1-undecanol, 2-octyl-1-dodecanol, 2-dodecyl-1-hexadecanol, 2-hexyl-1-dodecanol, 2-ethyl-1-octadecanol, 2-decyl-1-tetradecanol, 2-undecyl-1-pentadecanol, 2-dodecyl-1-hexadecanol, 2-tetradecyl-1-octadecanol, and combinations thereof.

The 2-alkylalkoxyethylene monomeric units having from 12 to 34 carbon atoms may be generated, for example, by polymerization of corresponding 2-alkylalkyl vinyl ethers. In some embodiments, useful 2-alkylalkyl vinyl ethers have from 14 to 26 carbon atoms.

In some embodiments, the average number of carbon atoms in the 2-alkylalkoxyethylene monomeric units is from 12 to 34, or even from 14 to 24.

In some embodiments, the polyvinyl ether polymer further comprises at least one of:
i) cyclic or branched alkoxyethylene monomeric units independently having from 5 to 11 carbon atoms (preferably having from 5 to 8 carbon atoms); or ii) linear alkoxyethylene monomeric units independently represented by the formula

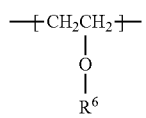

wherein $R^6$ represents a linear alkyl group having from 1 to 16 carbon atoms (preferably having from 1 to 8 carbon atoms).

These cyclic or branched alkoxyethylene monomeric units and linear alkoxyethylene monomeric units may be generated, for example, by copolymerization of corresponding alkyl vinyl ethers (branched, linear, or cyclic) with the 2-alkylalkyl vinyl ethers having 12 to 34 carbon atoms. The corresponding alkyl vinyl ethers may be obtained, for example, generally according to methods for obtaining the vinyl ethers for the 2-alkylalkoxyethylene monomeric units having from 12 to 34 carbon atoms described hereinabove, but using correspondingly different alcohols.

Examples of vinyl ethers suitable for generating cyclic or branched alkoxyethylene monomeric units having from 5 to 11 carbon atoms and linear alkoxyethylene monomeric units having from 1 to 16 carbon atoms include vinyl ethers of primary or secondary (i.e., non-tertiary) alkanols include methyl vinyl ether, ethyl vinyl ether, 1-propyl vinyl ether, 2-propyl vinyl ether, 1-butyl vinyl ether, 2-butyl vinyl ether, 1-pentyl vinyl ether, 2-pentyl vinyl ether, 3-pentyl vinyl ether, 2-methyl-1-butyl vinyl ether, 3-methyl-1-butyl vinyl ether, 1-hexyl vinyl ether, 2-hexyl vinyl ether, 2-methyl-1-pentyl vinyl ether, 3-methyl-1-pentyl vinyl ether, 2-ethyl-1-butyl vinyl ether, 3,5,5-trimethyl-1-hexyl vinyl ether, 3-heptyl vinyl ether, 1-octyl vinyl ether, 2-octyl vinyl ether, isooctyl vinyl ether, 2-ethyl-1-hexyl vinyl ether, 1-dodecyl vinyl ether, 1-hexadecyl vinyl ether, cyclohexyl vinyl ether, and combinations thereof.

The above vinyl ethers may be obtained from commercially sources and/or prepared, for example, according to known methods. Commercial sources of vinyl ethers include, for example, Aldrich Chemical Co., Milwaukee, Wis.; BASF, Ludwigshafen, Germany; and from Ashland Inc., Dublin, Ohio, under the trade designation RAPI-CURE.

In some embodiments, the average number of carbon atoms in the aforementioned branched alkoxyethylene monomeric units having from 5 to 11 carbon atoms or linear alkoxyethylene monomeric units having from 1 to 16 carbon atoms is from 5 to 10, although this is not a requirement.

If present, the cyclic or branched alkoxyethylene monomeric units having from 5 to 11 carbon atoms or linear alkoxyethylene monomeric units having from 1 to 16 carbon atoms are preferably present in an amount of 1 to 49 parts by weight, based on 100 parts of the polyvinyl ether polymer, although other amounts may also be used. More preferably, they are present in an amount of 5 to 45 parts by weight based on 100 parts of the polyvinyl ether polymer.

In some embodiments, it is desirable for the cyclic or branched monomeric units having from 5 to 11 carbon atoms or linear alkoxyethylene monomeric units having from 1 to 16 carbon atoms to be derived or derivable from vinyl ether monomers having a homopolymer with a $T_g$ of at least 25° C., preferably at least 50° C.

In some embodiments, the polyvinyl ether polymer comprises acidic monomeric units. That is, the monomeric units comprise an acidic group such as, for example, a carboxyl group (—$CO_2H$, e.g., as prepared by reaction of a hydroxyalkyl vinyl ether with a cyclic acid anhydride). Examples of vinyl ethers with alcohol groups that may be modified with an acid anhydride to form a carboxylic acid before and/or after polymerization include 2-hydroxyethyl vinyl ether, 4-hydroxybutyl vinyl ether, 6-hydroxyhexyl vinyl ether, and 8-hydroxyoctyl vinyl ether. Examples of suitable anhydrides include succinic anhydride, pentandioic anhydride, and adipic anhydride.

Preferably, the acidic monomeric units can be represented by the formula

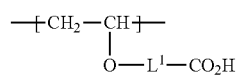

wherein $L^1$ represents an organic divalent linking group, preferably having from 1 to 12 carbon atoms. In some embodiments $L^1$ represents alkylene having from 1 to 12 carbon atoms, preferably from 1 to 6 carbon atoms. In some embodiments, $L^1$ comprises $L^2$-OC(=O)-$L^3$, wherein $L^2$ and $L^3$ independently represent alkylene groups having from 2 to 4 carbon atoms.

If present, the acidic monomeric units are typically present in amounts of greater than 0 to 15, preferably 0.5 to 15, more preferably 0.5 to 10, parts by weight, based on 100 parts by weight total polyvinyl ether polymer, although other amounts may also be used.

In some embodiments, the polyvinyl ether polymer further comprises non-acidic polar monomeric units (e.g., not containing a —$CO_2H$, —$SO_3H$, —$SO_4H$, —$PO_3H$, or —$PO_4H_2$ group) represented by the formula

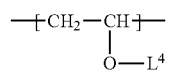

wherein each $L^4$ independently comprises a non-acidic polar group. Exemplary non-acidic polar groups $L^4$ include: hydroxyalkyl groups (e.g., hydroxyethyl, hydroxypropyl, or hydroxybutyl), preferably having from 2 to 18 carbon atoms, more preferably 2 to 8 carbon atoms; poly(alkylene oxide) ether-containing groups (e.g., poly(ethylene oxide)-containing groups and/or poly(propylene oxide)-containing groups), preferably having from 1 to 50 carbon atoms, more preferably from 6 to 20 carbons atoms; and 1°, 2°, and/or 3° aminoalkyl groups (e.g., aminoethyl, N-ethylaminoethyl, or N,N-dimethylaminoethyl); and groups represented by the formula

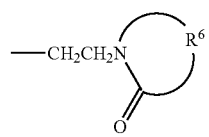

wherein $R^6$ represents alkylene having from 3 to 6 carbon atoms.

The non-acidic polar monomeric units may be useful, for example, for preparing polyvinyl ether polymers that are both somewhat oil-soluble and water-soluble.

Examples of non-acidic polar vinyl ethers that can be copolymerized with 2-alkylalkyl vinyl ethers (and any other optional vinyl ether monomers) include 2-hydroxyethyl vinyl ether, 4-hydroxybutyl vinyl ether, 6-hydroxyhexyl vinyl ether, 8-hydroxyoctyl vinyl ether, and vinyl ethers represented by the formula

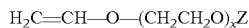

wherein: Z represents an alkyl group having 1 to 6 carbon atoms or H; and x is a number from 1 to 20, preferably 1 to 8, more preferably 1 to 4.

If present, the non-acidic polar monomeric units may be present in amounts of greater than 0 to 30 parts by weight, preferably 0.5 to 15 parts by weight, based on 100 parts by weight total monomer, although other amounts may also be used.

In some embodiments, the polyvinyl ether polymer comprises, based on 100 parts by weight of the polyvinyl ether polymer:
a) from 0.1 to 99 parts (preferably 55 to 99 parts) by weight of 2-alkylalkoxyethylene monomeric units having from 12 to 34 carbon atoms;
b) from 1 to 49 parts (preferably 1 to 45 parts, more preferably 5 to 45 parts) by weight of:
  i) cyclic or branched alkoxyethylene monomeric units independently having from 5 to 11 carbon atoms; or
  ii) linear alkoxyethylene monomeric units independently represented by the formula

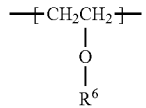

wherein $R^6$ represents a linear alkyl group having from 10 to 16 carbon atoms (preferably from 10 to 14 carbon atoms);
c) 0 to 20 parts (preferably 0.1 to 10 parts, and more preferably 0.5 to 5 parts) by weight of acidic monomeric units; and
d) 0 to 30 parts (preferably 0.5 to 20 parts, and more preferably 0.5 to 10 parts) by weight of non-acidic polar monomeric units.

Additional monomeric units may be incorporated into the polyvinyl ether polymer, typically in quantities less than about 30 percent (e.g., less than 20 percent, less than 10 percent, less than 5 percent, or even less than one percent), for example, as a result of copolymerization of a corresponding monomer. Examples of monomers that may be cationically copolymerized for this purpose include vinyl amides (e.g., N-vinylpyrrolidone, N-vinylcaprolactam, N-vinylformamide), styrene, and alpha-methylstyrene.

In some embodiments, the pressure-sensitive adhesive composition has a glass transition temperature of less than or equal to 10° C., 0° C., −10° C., −20° C., −30° C., or even less than or equal to −40° C.

PSA compositions according to the present disclosure may also contain one or more additives. Exemplary additives include tackifiers, plasticizers, dyes, antioxidants, and UV stabilizers.

Examples of suitable tackifiers include hydrogenated rosin resins, hydrogenated and esterified rosin resins, hydrogenated terpene resins, aliphatic petroleum resins, aromatic petroleum resins, alicyclic petroleum resins, phenol-modified terpenes and rosin esters such as glycerol esters of rosin and pentaerythritol esters of rosin that are available under the trade designations NUROZ and NUTAC from Newport Industries Ltd., London, England; and PENNALYN, STAYBELLITE, and from Eastman Chemical, Kingsport, Tenn.

Also useful are hydrocarbon resin tackifiers that typically come from $C_5$ and $C_9$ monomers by products of naphtha cracking and are available under the trade designations PICCOTAC, EASTOTAC, REGALREZ, REGALITE from Eastman Chemical; ARKON from Arakawa Chemical Industries Ltd., Osaka, Japan; NORSOLENE and WINTACK from Cray Valley SA, Paris, France; NEVTACK and LX from Neville Chemical Co., Pittsburgh, Pa.; HIKOTACK and HIKOREZ from Kolon Chemical Co. Ltd., Gwacheon, South Korea; NOVARES from Rutgers Novares GmbH, Castrop-Rauxel, Germany; QUINTONE from Zeon Corp., Tokyo, Japan; ESCOREZ 10 from ExxonMobil Chemical Co., Houston, Tex.; and NURES and H-REZ from Newport Industries.

If present, the tackifier typically comprises from 20 to 150 parts by weight, of the tackifier for every 100 parts by weight of the polyvinyl ether polymer, however this is not a requirement.

In order to improve shear and/or other properties, it may be desirable to crosslink the polyvinyl ether polymer to provide a crosslinked polyvinyl ether polymer. As used herein, the term "crosslink" refers to formation of covalently bonded link between adjacent chains of atoms between two or more polymer molecules. Various general methods are known, and include incorporation of polyfunctional vinyl ether(s) (e.g., divinyl ether, ethylene divinyl ether, propylene divinyl ether, and/or butylene divinyl ether). Trifunctional and higher functionality vinyl ethers may also be used. Typically, if polyfunctional vinyl ethers are used, they are added to the monomer mixture used to form the polyvinyl ether polymer in an amount of from 0.01 to 10 percent by weight, preferably from 0.1 to 5 percent by weight based on the total weight of monomers used to from the polyvinyl ether polymer. Crosslinking may also or in addition be achieved using high energy electromagnetic radiation such as gamma or e-beam radiation. The degree of crosslinking will depend on desired performance characteristics and will be readily ascertainable to those of skill in the art.

The amount and identity of multifunctional vinyl ethers is tailored depending upon application of the adhesive composition. If present, the multifunctional vinyl ether is typically present in amounts less than 5 parts by weight based on total dry weight of adhesive composition. More specifically, the multifunctional vinyl ether may be present in amounts from 0.01 to 5 parts by weight, preferably 0.05 to 1 parts by weight, based on 100 parts by weight of the polyvinyl ether polymer.

Many of the same rheological characteristics that contribute to the adhesive performance of PSAs may also make these materials excellent vibration damping materials. PSAs generally have a significant viscous component as well as a $T_g$ close to the target use temperature that inherently also contributes to the dissipation of energy such as vibrational energy at this temperature. While the rheology of a PSA must be carefully tuned for optimum adhesion performance at a given use temperature, so must the viscoelastic nature of a vibration damping material to effectively dissipate the target frequencies over the intended temperature range. For example, for better damping performance, it is widely accepted that the ratio of loss modulus to storage modulus, often represented by the term Tan Delta, should be greater than one over the intended use temperature range. In most polymers, this high level of Tan Delta occurs near the glass transition temperature of the material which may be tuned to different temperatures for maximum damping potential using known formulation practices.

In some embodiments, polyvinyl ether polymers used in PSA compositions according to the present disclosure have characteristics that may provide advantageous vibration damping performance. Compared to conventional polyvinyl ether polymers used in PSA compositions, the Tan Delta value is greater than 1 over a much broader temperature range. Thus, a high level of energy dissipation and vibration damping is expected over a broader temperature range, subsequently extending the use temperature range of such materials. Furthermore, PSA compositions according to the present disclosure may exhibit relatively low storage modulus (G') at typical use temperatures, which is typically indicative of good vibration damping performance. This breadth of Tan Delta can be represented by the width of the Tan Delta peak during a temperature scan of the material and is often represented by fixed height peak width (FHPW), measuring the width in degrees of the peak at a fixed Tan Delta value. Furthermore, one can plot the temperature range in which the Tan Delta value of the material is greater than 1 during the same temperature scan to directly show over what range efficient energy dissipation is expected.

There are particular vibration damping applications in which material selection or tuning of the material is extremely challenging. For example, at very low temperatures and/or very high frequencies, vibration damping becomes very challenging as typical polymeric materials are not able to keep the high ratio of loss to storage modulus under these conditions. PSA compositions according to the present disclosure may exhibit very low $T_g$ values compared to typical vinyl ether polymers and have a Tan Delta value greater than one at very low temperatures or at very high frequencies, indicating utility in energy dissipation and vibration damping applications at these particularly challenging conditions.

Polyvinyl ether polymers used in the present disclosure can be made by polymerization (typically cationic polymerization) of corresponding vinyl ether monomers. Methods for polymerization of vinyl ethers are well known and include, for example, polymerization processes such as those described in U.S. Pat. No. 3,718,634 (Schultz). Examples of suitable cationic catalysts include metal halides, organometallic halides, metal oxyhalides, metal oxides, metal sulfates, stable carbenium ion salts, and Ziegler-Natta coordination catalysts. Photopoly-merization of vinyl ethers by photogeneration of acidic catalysts (using onium salts and/or cationic organometallic photogenerated catalysts as reported in EP 0 447 115 (Aeling) and in PCT Publ. Internat. Appl. No. WO 89/08097 (Lapin et al.), may also be used.

The amount and type of catalytic species will depend on the specific method chosen, and will be understood to those of skill in the art.

The polyvinyl ether polymer(s) included in the PSA composition may be, for example, homopolymer(s), and/or a random or block copolymer(s).

PSA compositions according to the present disclosure are useful, for example in manufacture of adhesive articles. Referring now to FIG. 1, exemplary adhesive article 100 comprises layer of pressure-sensitive adhesive composition 120, according to the present disclosure, disposed on substrate 110.

PSA adhesive compositions according to the present disclosure may be coated upon the substrate using conventional coating techniques to produce a layer of PSA adhesive on the substrate. For example, the PSA adhesive compositions can be applied to solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated. The PSA adhesive can also be provided in the form of a pressure-sensitive adhesive transfer tape.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

Suitable substrates include conventional tape backings and other flexible materials. Examples include plastic films (e.g., comprising polypropylene, polyethylene, polyvinyl chloride, polyester (polyethylene terephthalate), polycarbonate, polymethyl methacrylate (PMMA), cellulose acetate, cellulose triacetate, or ethyl cellulose). Useful substrates also include foam backings. Examples of inflexible substrates include, but are not limited to, metals, indium tin oxide coated glass, PMMA plate, polycarbonate plate, glass, and ceramic sheet materials. Adhesive articles according to the present disclosure may take the form of any article conventionally known to be utilized with adhesive compositions such as, for example, labels, tapes, signs, covers, marking indices, display components, and touch panels. Substrates having microreplicated surface texture may also be used.

To make a single-sided PSA tape, the side of the substrate (tape backing) backing surface opposite that where the adhesive is disposed is typically coated with a suitable release material. Release materials are known and include materials such as, for example, silicones, polyolefins (e.g., polyethylene, polypropylene), polycarbamates, and polyacrylics. For double-coated tapes, another layer of adhesive is disposed on the backing surface opposite that where the adhesive of the invention is disposed. The other layer of adhesive can be different from the PSA adhesive compositions of the present disclosure (e.g., a conventional acrylic PSA) or it can be the same. Double-coated tapes are typically carried on a release liner.

Select Embodiments of the Present Disclosure

In a first embodiment, the present disclosure provides a pressure-sensitive adhesive composition comprising a polyvinyl ether polymer, wherein the polyvinyl ether polymer comprises 2-alkylalkoxyethylene monomeric units independently represented by the formula

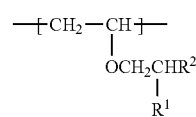

wherein $R^1$ and $R^2$ represent alkyl groups, and wherein taken together $R^1$ and $R^2$ have from 8 to 30 carbon atoms.

In a second embodiment, the present disclosure provides a pressure-sensitive adhesive composition according to the first embodiment, wherein the polyvinyl ether polymer is crosslinked.

In a third embodiment, the present disclosure provides a pressure-sensitive adhesive composition according to the first or second embodiment, wherein the average number of carbon atoms in the 2-alkylalkoxyethylene monomeric units is from 12 to 24.

In a fourth embodiment, the present disclosure provides a pressure-sensitive adhesive composition according to any one of the first to third embodiments, wherein the polyvinyl ether polymer further comprises at least one of:
  a) cyclic or branched alkoxyethylene monomeric units independently having from 5 to 11 carbon atoms; or
  b) linear alkoxyethylene monomeric units independently represented by the formula

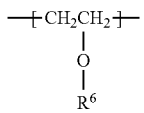

wherein $R^6$ represents a linear alkyl group having from 1 to 16 carbon atoms.

In a fifth embodiment, the present disclosure provides a pressure-sensitive adhesive composition according to any one of the first to fourth embodiments, further comprising acidic monomeric units.

In a sixth embodiment, the present disclosure provides a pressure-sensitive adhesive composition according to any one of the first to fifth embodiments, further comprising non-acidic polar monomeric units.

In a seventh embodiment, the present disclosure provides a pressure-sensitive adhesive composition according to any one of the first to sixth embodiments, wherein at least one of $R^1$ or $R^2$ is branched.

In an eighth embodiment, the present disclosure provides a pressure-sensitive adhesive composition according to the seventh embodiment, wherein $R^1$ and $R^2$ each independently have from 3 to 9 carbon atoms, inclusive.

In a ninth embodiment, the present disclosure provides a pressure-sensitive adhesive composition according to any one of the first to eighth embodiments, wherein the first monomeric units are independently represented by the formula

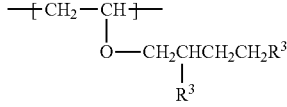

wherein $R^3$ represents an alkyl group having from 3 to 12 carbon atoms.

In a tenth embodiment, the present disclosure provides a pressure-sensitive adhesive composition according to the first or second embodiment, wherein the polyvinyl ether polymer comprises:
  a) from 0.1 to 99 parts by weight of 2-alkylalkoxyethylene monomeric units having from 12 to 34 carbon atoms;
  b) from 1 to 49 parts by weight of:
    i) cyclic or branched alkoxyethylene monomeric units independently having from 5 to 11 carbon atoms; or
    ii) linear alkoxyethylene monomeric units independently represented by the formula

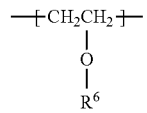

wherein $R^6$ represents a linear alkyl group having from 1 to 16 carbon atoms;
  c) 0 to 20 parts by weight of acidic monomeric units; and
  d) 0 to 30 parts by weight of non-acidic polar monomeric units.

In an eleventh embodiment, the present disclosure provides a pressure-sensitive adhesive composition according to the tenth embodiment, wherein the polyvinyl ether polymer comprises from 0.1 to 10 parts by weight of the acidic monomeric units.

In a twelfth embodiment, the present disclosure provides a pressure-sensitive adhesive composition according to the tenth or eleventh embodiment, wherein the polyvinyl ether polymer comprises from 0.5 to 10 parts by weight of the non-acidic polar monomeric units.

In a thirteenth embodiment, the present disclosure provides a pressure-sensitive adhesive composition according to any one of the first to twelfth embodiments, wherein the pressure-sensitive adhesive composition has a glass transition temperature of less than or equal to +10° C.

In a fourteenth embodiment, the present disclosure provides a pressure-sensitive adhesive composition according to any one of the first to thirteenth embodiments, further comprising a tackifier.

In a fifteenth embodiment, the present disclosure provides a pressure-sensitive adhesive composition according to the fourteenth embodiment, wherein the tackifier comprises from 20 to 150 parts by weight, of the tackifier for every 100 parts by weight of the polyvinyl ether polymer.

In a sixteenth embodiment, the present disclosure provides a pressure-sensitive adhesive composition according to the fourteenth or fifteenth embodiment, wherein the tackifier is selected from hydrogenated rosin resins, hydrogenated and esterified rosin resins, hydrogenated terpene resins, aliphatic petroleum resins, aromatic petroleum resins, and alicyclic petroleum resins.

In a seventeenth embodiment, the present disclosure provides an adhesive article comprising a layer of a pressure-sensitive adhesive composition according to any one of the first to sixteenth embodiments disposed on a substrate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials Used in the Examples

| ABBREVIATION | DESCRIPTION |
|---|---|
| BDDVE | 1,4-butanediol divinyl ether, available from Aldrich Chemical Company; Milwaukee, Wisconsin |
| BVE | n-butyl vinyl ether, available from Alfa Aesar, Ward Hill, Massachusetts |
| CHVE | cyclohexyl vinyl ether, available from TCI America, Portland, Oregon |
| DDVE | n-dodecyl vinyl ether, available from Aldrich Chemical Co. |
| DPP | 4,7-diphenylphenanthroline, available from Alfa Aesar |
| EG | 2-octyl-1-dodecanol, available as EUTANOL G from BASF, Ludwigshafen, Germany |
| EHVE | 2-ethylhexyl vinyl ether, available from TCI America |
| HD | 2-hexyl-1-decanol, available as ISOFOL 16 ALCOHOL from Sasol North America |
| I12 | 2-butyl-1-octanol, available as ISOFOL 12 ALCOHOL from Sasol North America, Houston, Texas |
| I28 | 2-dodecyl-1-hexadecanol, available as ISOFOL 28 ALCOHOL from Sasol North America |
| I32 | 2-tetradecyl-1-octadecanol, available as ISOFOL 32 ALCOHOL from Sasol North America |
| I18T | a mixture of 2-hexyl-1-decanol, 2-octyl-1-decanol, 2-hexyl-dodecanol, and 2-octyl-1-dodecanol available as ISOFOL 18T ALCOHOL from Sasol North America |
| PdTFA | palladium trifluoroacetate, available from Alfa Aesar |
| PH | a mixture of 2-propyl-1-heptanol (85%) and 4-methylpropylhexanol/5-methylpropylhexanol (15%), available as PROPYLHEPTANOL from BASF, Ludwigshafen, Germany |
| TEA | triethylamine, available from EMD Chemicals, Gibbstown, New Jersey |

Preparation of Vinyl Ethers Used in the Examples

A mixture of PdTFA, DPP, BVE, the indicated alcohol, and TEA was heated to 75° C. under nitrogen for the time shown in Table 1. The reaction mixture was cooled and filtered through a short plug of silica in a sintered glass funnel. The silica was washed once with 20 mL of hexane. The filtrate was concentrated under vacuum to give a yellow crude product. The crude product was mixed with an equal portion of hexane and purified by column chromatography over silica gel using hexane as the solvent. The collected fractions were concentrated under vacuum to give the final product as a colorless oil (Preparatory Examples 1-5) or white solid (Preparatory Examples 6-7). Details are reported in TABLE 1 (below).

TABLE 1

| PREPARATORY EXAMPLE | ALCOHOL | AMOUNT, grams ALCOHOL | AMOUNT, grams BVE | AMOUNT, milligrams PdTFA | AMOUNT, milligrams DPP | AMOUNT, milliliters TEA | REACTION TIME, hours | YIELD, grams |
|---|---|---|---|---|---|---|---|---|
| PE1 | PH | 10.01 | 126.35 | 102 | 103 | 6.3 | 5 | 10.03 |
| PE2 | I12 | 8.00 | 85.07 | 72 | 72 | 4.3 | 5 | 7.81 |
| PE3 | I16 | 6.06 | 49.56 | 42 | 42 | 2.5 | 4 | 5.78 |
| PE4 | I18T | 8.00 | 59.95 | 54 | 50 | 3.0 | 7 | 7.77 |
| PE5 | EG | 8.94 | 60.05 | 49 | 51 | 3.0 | 7 | 8.34 |
| PE6 | I28 | 12.29 | 63.93 | 52 | 51 | 3.0 | 5 | 11.68 |
| PE7 | I32 | 14.10 | 60.15 | 51 | 50 | 3.0 | 5 | 11.56 |

Test Method 1: Differential Scanning Calorimetric Analysis of Monomers and Homopolymer Films Approximately 10 mg of each of the monomer or polymer samples were placed in individual standard aluminum differential scanning calorimeter (DSC) pans (part no. T080715, from TA Instruments, New Castle, Del.) and placed in the autosampler of a Model Q200 differential scanning calorimeter from TA Instruments. For each sample analysis, pans were individually placed on one of the differential posts in the DSC's enclosed cell along with an empty reference pan on the opposite post. Temperature was raised to 55° C. and held for 10 minutes to thermally anneal the sample, which was then cycled between −95° C. and 55° C. twice at 3° C./min. Transitions such as the crystallinity temperature ($T_c$), melting temperature ($T_m$), and glass transition temperature ($T_g$) were identified as their respective peaks in the scanning profile of heat flow vs. temperature. Typically, crystallization and melting transitions show up as positive and negative heat flow peaks as the sample is cooled and heated respectively. Conversely, a glass transition is generally represented by a shift in the profile upon heating where the heat profile after the transition is parallel but shifted lower compared to before the transition. The glass transition temperature is recorded at the inflection point of the curve associated with this shift in heat flow profile.

Test Method 2: Dynamic Mechanical Analysis of Homopolymer Films

Dynamic mechanical analysis (DMA) of each of the polymer samples was accomplished using an AR2000 parallel plate rheometer (from TA Instruments) to characterize the physical properties of each sample as a function of temperature. For each sample, an 8 mm diameter by 1 mm thick sample was cut out of a rectangular slab of the polymer and centered between 8 mm diameter parallel plates of the rheometer. The furnace doors that surround the parallel plates and shafts of the rheometer were shut, and the temperature was raised to 70° C. and held for 5 minutes. The temperature was then ramped from 70° C. to −80° C. at 3° C./min while the parallel plates were oscillated at a frequency of 1 Hz and a constant % strain of 0.4%. While many physical parameters of the material are recorded during the temperature ramp, storage modulus (G'), loss modulus (G"), and tan delta are of primary importance in the characterization of the polymers of the present disclosure.

The glass transition temperature, $T_g$, of the adhesive composition can be measured by first determining its storage modulus (G') and loss shear modulus (G"). The ratio of G"/G', a unit less parameter typically denoted "tan delta" is plotted versus temperature. The maximum point (point where the slope is zero) in the transition region between the glassy region and the rubbery region of the tan delta curve, if well defined, determines the $T_g$ of the adhesive composition at that particular frequency.

The shape and width of the tan delta profile vs. temperature are also important factors that can lend insight into the nature of the polymer network structure and chain structure that is present in each homopolymer system. For example, a broad tan delta peak often suggests greater heterogeneity with a network or polymer chains with a broad distribution of segmental motions at different temperatures. This characterization can be taken further to a system in which there are two distinct peaks within the tan delta profile often suggesting discrete phase separated domains within a material/network or polymer chains with multiple modes of segmental motion within the polymer backbone or side chain structures. For each of the crosslinked homopolymer films generated, storage modulus was recorded at a specific temperature of 10° C. that fell within the rubbery plateau regime for each sample, $T_g$ was recorded at the peak of the tan delta curve, and the width of the tan delta peak was quantified by taking the peak width at a fixed height of approximately half of the peak intensity (FHPW).

The tan delta curve for each polymer was further analyzed to determine the temperature range over which the polymer sample would be expected to exhibit exceptional energy dissipation. This is typically recognized in a polymeric material when the loss modulus is greater than the storage modulus (tan delta>1). Charting low temperature to high along the tan delta curve, the low temperature point at which the tan delta crosses 1 is subtracted from the higher temperature at which the tan delta value again crosses 1 to give the temperature range over which the tan delta value is greater than 1.

Test Method 3: Probe Tack Test

A TA.XT PLUS texture analyzer (from Texture Technologies, Scarsdale, N.Y.) with a 5 kg load cell was used for adhesive performance measurements including both the work done and peak force upon probe retraction from the adhesive slab. A 6 mm diameter hemispherical stainless steel probe, 6 mm diameter flat stainless steel probe, or a 6 mm diameter flat high density polyethylene (HDPE) probe was fixed to the load cell of the texture analyzer. The adhesive slab on glass slide was then fixed to the stage of the texture analyzer with exposed adhesive facing upwards to the probe. For each test, the probe was brought into contact with the adhesive using a speed of 0.5 mm/sec until a normal force of 50 g was achieved, allowed to dwell for 30 seconds at that depth, and then retracted at a rate of 0.5 mm/sec until the adhesive failed and the normal force was 0 g. During retraction, the normal force was plotted as a function of distance. The area under the curve was calculated and reported as the work (gram-force*mm), and the peak normal force was recorded from the peak of this plot (gram-force).

DSC Analysis of Vinyl Ether Monomer Samples

Basic thermal analysis was done on each monomer using DSC as described in Test Method 1 above. Results are reported in Table 2 (below).

TABLE 2

| VINYL ETHER | NO. OF CARBON ATOMS IN ALKOXY MOIETY | $T_c$, ° C. | $T_m$, ° C. |
|---|---|---|---|
| BVE | 4 | not observed | not observed |
| EHVE | 8 | not observed | not observed |
| DDVE | 12 | −20.3 | −7.0 |
| PE1 | 10 | not observed | not observed |
| PE2 | 12 | not observed | not observed |
| PE3 | 16 | −67.8 | −33.7 |
| PE4 | 18 | −55.0 | −27.0 |
| PE5 | 20 | −31.9 | −2.6 |
| PE6 | 28 | 3.3 | 28.4 |
| PE7 | 32 | 16.5 | 37.2 |

Examples 1-7 and Comparative Examples A-C

Polymer samples were prepared and tested as follows. A rectangular mold was cut from a silicone rubber sheet (1.59 mm thickness, part no. DSP6038GP-062 from Diversified Silicone Products, Santa Fe Springs, Calif.) with internal dimensions of 25.4 mm×12.7 mm. The silicone mold was placed between two microscope glass slides and the slides were held together by clamps. A mixture of the desired vinyl ether monomer, butanediol divinyl ether (BDDVE), and 1 wt. % boron trifluoride etherate in tetrahydrofuran (BTFE SOLUTION), in amounts as reported in Table 3, was mixed in a vial and then injected into the mold. The clamped assembly was stood on edge and left at room temperature for 24 hours. The assembly was then cooled with dry ice for five minutes, and one slide was carefully removed to leave the cured polymer on the surface of one slide.

TABLE 3

| EXAMPLE | VINYL ETHER MONOMER | VINYL ETHER MONOMER, grams | BDDVE CROSS-LINKER, grams | BTFE SOLUTION, grams |
|---|---|---|---|---|
| COMPARATIVE EXAMPLE A | BVE | 0.990 | 0.010 | 0.029 |
| COMPARATIVE EXAMPLE B | DDVE | 0.990 | 0.010 | 0.030 |
| COMPARATIVE EXAMPLE C | EHVE | 0.992 | 0.011 | 0.033 |
| 1 | PE1 | 1.296 | 0.014 | 0.034 |
| 2 | PE2 | 0.990 | 0.010 | 0.032 |
| 3 | PE3 | 0.992 | 0.011 | 0.032 |
| 4 | PE4 | 0.993 | 0.011 | 0.042 |
| 5 | PE5 | 0.992 | 0.010 | 0.031 |
| 6 | PE6 | 0.992 | 0.010 | 0.032 |
| 7 | PE7 | 0.989 | 0.011 | 0.034 |

DSC and DMA analysis for the polymers was completed following the procedures of Test Methods 1 and 2. Results are reported in Table 4 (below).

TABLE 4

| | DSC | | | DMA | | | | |
|---|---|---|---|---|---|---|---|---|
| EXAMPLE | $T_c$, ° C. | $T_m$, ° C. | $T_g$, ° C. | $T_c$, ° C. | $T_g$, ° C. | G' at 10° C., pascals | FHPW, ° C. | tan delta >1, ° C. |
| COMP. EX. A | not observed | not observed | −50.75 | not observed | −35.0 | 91500 | 15.7 | 20 |
| COMP. EX. B | −12.8 | −0.2 | not observed | −1.2 | not observed | 20300 | NA | NA |
| COMP. EX. C | not observed | not observed | −71.2 | not observed | −49.3 | 26050 | 35.2 | 28 |
| 1 | not observed | not observed | −65.8 | not observed | −38.8 | 46100 | 43.5 | 31.5 |

TABLE 4-continued

| | DSC | | | DMA | | | | |
|---|---|---|---|---|---|---|---|---|
| EXAMPLE | $T_c$, °C. | $T_m$, °C. | $T_g$, °C. | $T_c$, °C. | $T_g$, °C. | G' at 10° C., pascals | FHPW, °C. | tan delta >1, °C. |
| 2 | not observed | not observed | −71.6 | not observed | −42.3 | 31290 | 46.6 | 35.1 |
| 3 | not observed | not observed | −72.7 | not observed | −43.8 | 21910 | 49.0 | 34.9 |
| 4 | not observed | not observed | −70.2 | not observed | −45.5 | 11525 | 46.1 | 34.0 |
| 5 | −64.8 | −60.9 | −65.2 | not observed | −44.4 | 9420 | 46.7 | 31.6 |
| 6 | −6.7 | −0.2 | not observed | −11.2 | not observed | 1235 | not observed | not observed |
| 7 | 12.0 | 22.3 | not observed | 1.9 | not observed | not observed | not observed | not observed |

Examples 8-14 and Comparative Examples 4-6

Pressure-sensitive adhesive (PSA) copolymer slabs were prepared and tested according to the same method used for Examples 1-7. Table 5 (below) reports amounts of components used to prepare each example.

TABLE 5

| EXAMPLE | VINYL ETHER MONOMER | VINYL ETHER MONOMER, grams | CHVE, grams | BDDVE CROSSLINKER, grams | BTFE SOLUTION, grams |
|---|---|---|---|---|---|
| COMP. EX. D | BVE | 1.001 | 1.004 | 0.020 | 0.056 |
| COMP. EX. E | DDVE | 1.002 | 0.997 | 0.021 | 0.050 |
| COMP. EX. F | EHVE | 1.002 | 1.003 | 0.021 | 0.059 |
| 8 | PE1 | 1.000 | 1.001 | 0.019 | 0.062 |
| 9 | PE2 | 1.002 | 1.002 | 0.019 | 0.058 |
| 10 | PE3 | 1.002 | 1.000 | 0.020 | 0.053 |
| 11 | PE4 | 1.003 | 1.008 | 0.021 | 0.051 |
| 12 | PE5 | 1.005 | 1.004 | 0.021 | 0.061 |
| 13 | PE6 | 1.005 | 1.000 | 0.019 | 0.053 |
| 14 | PE7 | 1.002 | 1.000 | 0.022 | 0.058 |

The adhesive properties of the samples were determined using a probe tack test according to Test Method 3. Results are reported in Table 6 (below).

TABLE 6

| | S.S. HEMI PROBE | | S.S. FLAT PROBE | | HDPE FLAT PROBE | |
|---|---|---|---|---|---|---|
| EXAMPLE | PEAK FORCE, gram-force | WORK, gram-force*mm | PEAK FORCE, gram-force | WORK, gram-force*mm | PEAK FORCE, gram-force | WORK, gram-force*mm |
| COMPARATIVE EXAMPLE D | 106.3 | 58.8 | 730.5 | 282.3 | 141.7 | 29.8 |
| COMPARATIVE EXAMPLE E | 55.5 | 27.9 | 448.5 | 219.6 | 245.6 | 67.2 |
| COMPARATIVE EXAMPLE F | 71.4 | 37.6 | 694.9 | 586.9 | 327.0 | 88.1 |
| 8 | 84.2 | 37.6 | 875.0 | 240.3 | 348.9 | 79.1 |
| 9 | 83.0 | 32.3 | 914.2 | 420.9 | 178.8 | 30.3 |
| 10 | 55.7 | 22.4 | 348.9 | 175.6 | 151.6 | 39.7 |
| 11 | 66.2 | 30.1 | 430.9 | 154.1 | 152.7 | 46.1 |
| 12 | 50.2 | 11.8 | 548.9 | 218.1 | 289.6 | 64.4 |
| 13 | 40.5 | 7.3 | 664.7 | 157.3 | 258.9 | 38.1 |
| 14 | 31.6 | 4.7 | 548.9 | 110.2 | 171.2 | 22.7 |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A pressure-sensitive adhesive composition comprising a polyvinyl ether polymer, wherein the polyvinyl ether polymer comprises 2-alkylalkoxyethylene monomeric units independently represented by the formula

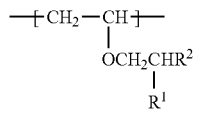

wherein $R^1$ and $R^2$ represent alkyl groups, and wherein taken together $R^1$ and $R^2$ have from 8 to 30 carbon atoms, wherein the pressure-sensitive adhesive composition has a glass transition temperature of less than or equal to +10° C.

2. The pressure-sensitive adhesive composition of claim 1 wherein the polyvinyl ether polymer is crosslinked.

3. The pressure-sensitive adhesive composition of claim 1, wherein the average number of carbon atoms in the 2-alkylalkoxyethylene monomeric units is from 12 to 24.

4. The pressure-sensitive adhesive composition of claim 1, wherein the polyvinyl ether polymer further comprises at least one of:
a) cyclic or branched alkoxyethylene monomeric units independently having from 5 to 11 carbon atoms; or
b) linear alkoxyethylene monomeric units independently represented by the formula

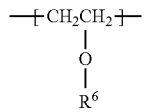

wherein $R^6$ represents a linear alkyl group having from 1 to 16 carbon atoms.

5. The pressure-sensitive adhesive composition of claim 1, further comprising acidic monomeric units.

6. The pressure-sensitive adhesive composition of claim 1, further comprising non-acidic polar monomeric units.

7. The pressure-sensitive adhesive composition of claim 1, wherein at least one of $R^1$ or $R^2$ is branched.

8. The pressure-sensitive adhesive composition of claim 7, wherein $R^1$ and $R^2$ each independently have from 3 to 9 carbon atoms, inclusive.

9. The pressure-sensitive adhesive composition of claim 1, wherein the polyvinyl ether polymer comprises:
a) from 0.1 to 99 parts by weight of 2-alkylalkoxyethylene monomeric units having from 12 to 34 carbon atoms;
b) from 1 to 49 parts by weight of:
i) cyclic or branched alkoxyethylene monomeric units independently having from 5 to 11 carbon atoms; or
ii) linear alkoxyethylene monomeric units independently represented by the formula

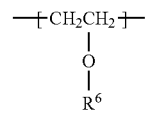

wherein $R^6$ represents a linear alkyl group having from 1 to 16 carbon atoms;
c) 0 to 20 parts by weight of acidic monomeric units; and
d) 0 to 30 parts by weight of non-acidic polar monomeric units.

10. The pressure-sensitive adhesive composition of claim 9, wherein the polyvinyl ether polymer comprises from 0.1 to 10 parts by weight of the acidic monomeric units.

11. The pressure-sensitive adhesive composition of claim 9, wherein the polyvinyl ether polymer comprises from 0.5 to 10 parts by weight of the non-acidic polar monomeric units.

12. The pressure-sensitive adhesive composition of claim 1, further comprising a tackifier.

13. The pressure-sensitive adhesive composition of claim 12, wherein the tackifier comprises from 20 to 150 parts by weight, of the tackifier for every 100 parts by weight of the polyvinyl ether polymer.

14. The pressure-sensitive adhesive composition of claim 12, wherein the tackifier is selected from hydrogenated rosin resins, hydrogenated and esterified rosin resins, hydrogenated terpene resins, aliphatic petroleum resins, aromatic petroleum resins, and alicyclic petroleum resins.

15. An adhesive article comprising a layer of the pressure-sensitive adhesive composition of claim 1 disposed on a substrate.

* * * * *